Patented Oct. 4, 1927.

1,644,546

UNITED STATES PATENT OFFICE.

LEOPOLD RUZICKA, OF ZURICH, SWITZERLAND, ASSIGNOR TO M. NAEF & CO., OF GENEVA, SWITZERLAND, A CORPORATION OF SWITZERLAND.

PROCESS FOR THE MANUFACTURE OF d. l.-NEROLIDOL.

No Drawing. Application filed March 19, 1924, Serial No. 700,439, and in Switzerland March 22, 1923.

It is known that peruviol, which is an alcohol contained in Peruvian balsam, is identical with $d$.-nerolidol which is a sesquiterpenic alcohol of the essence of orange blossoms (Berichte of the firm Schimmel & Co. Miltitz, April 1914, page 75).

It has been found that $d$.-nerolidol, when oxidized with chromic acid, yields farnesal, and when treated with certain weak acid agents (for instance acetic acid anhydride), yields farnesol.

This farnesol, when oxidized to an aldehyde by treatment with chromic acid, yields a semi-carbazone which melts at 133° C. This semi-carbazone is prepared in accordance with the method outlined in Berichte der Deutsch-Chem. Gesellschaft vol. 46, page 1732. The farnesol so prepared contains beside one or more other stereoisomerides, also the farnesol which is found in muskseed oil.

The constitution of nerolidol deduced from those reactions as being a methyl-vinyl-homogeranyl-carbinol, has been confirmed by synthesis.

Nerolidol has the formula:

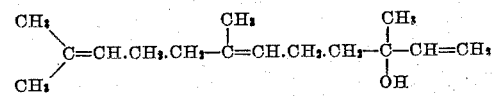

As a matter of fact it has been found that methyl-ethinyl-homogeranyl-carbinol produced from $\alpha.\beta$-dihydro-pseudo-ionone and acetylene, can be converted, by treatment with moderate reducing agents, into $d. l.$-nerolidol.

The latter, like $d$.-nerolidol, can be converted into farnesol or farnesal, and it can serve either as an odoriferous substance, or as a starting point for the preparation of other perfumes.

The present invention now has for its object to provide an improved process for the manufacture of $d. l$-nerolidol, according to which $\alpha.\beta$ dihydro-pseudo-ionone is condensed with acetylene to methyl-ethinyl-homogeranyl-carbinol, and the latter is reduced to $d. l.$-nerolidol.

Example.

45 parts of powdered sodium amide are mixed with 1000 parts of absolute ether, and then 194 parts of dihydro-pseudo-ionone are added, with stirring, in the cold below 0° C.

The product of the reaction is then saturated with acetylene, and the organic solution is separated out after treatment with iced water.

By distillation, pure methyl-ethinyl-homogeranyl-carbinol is obtained, almost quantitatively, in the form of a colourless oil boiling at 100–102° C. under 0.3 millimeters, $d_4^{19}=0.8908$ and $n_D^{19}=1.4789$.

For the purpose of a further reduction, it is unnecessary to isolate the carbinol. 46 parts of sodium may be added directly to the solution together with a gradual addition of a quantity of water sufficient to dissolve the sodium.

On distilling the organic solution, $d. l.$-nerolidol is obtained quantitatively in the form of a colourless oil boiling at 145° C. under 12 mm. and of $d_4^{19}=0.875$, $n_D^{19}=1.4801$.

This substance has a faint odour of flowers.

In the above-given example the ether may be replaced by another suitable solvent, such as benzene or a mixture of benzene and ether, and the sodium amide may be replaced by a substance having similar properties, such as powdered sodium, whilst sodium-acetylide may be used in place of the sodium amide and acetylene.

Moreover the order in which the several substances are added may likewise be altered: For instance the sodium amide may be added to the organic solution of di-hydro-pseudo-ionone. Likewise, for the purpose of reducing the methyl-ethinyl-homogeranyl-carbinol, there may be used, in place of sodium in the presence of ether and water, sodium and alcohol or hydrogen in the presence of catalyzers such as nickel, platinum and palladium in a finely subdivided state.

I claim:

1. Process for the manufacture of $d. l$-nerolidol which consists in treating the sodium compound of the $\alpha. \beta.$ dihydropseudoionone with acetylene and in reducing the obtained methyl-ethinyl-homogeranyl-carbinol to $d. l$-nerolidol.

2. The herein described product consisting of $d. l$-nerolidol, the same being a colourless liquid boiling at 145 degrees centigrade under 12 millimeters, having a density at 19 degrees centigrade with regard to that of water at 4 degrees centigrade: $d_4^{19}=0.875$, an index of refraction at 19 degrees centigrade for line D: $n_D^{19}=1.4801$; having a faint odour of flowers, and, for the purpose of identification, convertible by chromic acid into farnesal whose semi-carbazone melts at 133 degrees centigrade.

In testimony whereof I have affixed my signature.

LEOPOLD RUZICKA.